United States Patent
Yang (10) Patent No.: US 12,004,136 B2
(45) Date of Patent: Jun. 4, 2024

(54) METHOD FOR DETERMINING SIDELINK RESOURCE AND DEVICE

(71) Applicant: VIVO MOBILE COMMUNICATION CO., LTD., Guangdong (CN)

(72) Inventor: Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 534 days.

(21) Appl. No.: 17/212,958

(22) Filed: Mar. 25, 2021

(65) Prior Publication Data
US 2021/0307011 A1    Sep. 30, 2021

Related U.S. Application Data (63) Continuation of application No. PCT/CN2019/106936, filed on Sep. 20, 2019.

(30) Foreign Application Priority Data

Sep. 27, 2018   (CN) .......................... 201811134305.6

(51) Int. Cl.
  *H04W 72/0453*   (2023.01)
  *H04W 72/54*     (2023.01)
  *H04W 92/18*     (2009.01)

(52) U.S. Cl.
  CPC ....... *H04W 72/0453* (2013.01); *H04W 72/54* (2023.01); *H04W 92/18* (2013.01)

(58) Field of Classification Search
  CPC . H04W 72/0453; H04W 72/54; H04W 92/18; H04W 72/52; H04W 72/02; H04W 72/541
  See application file for complete search history.

(56) References Cited

U.S. PATENT DOCUMENTS

2018/0092065 A1    3/2018  Sheng
2019/0159218 A1*   5/2019  Seo .................... H04W 4/70
(Continued)

FOREIGN PATENT DOCUMENTS

CN    108260163 A     7/2018
JP    2021-503727 A   2/2021
(Continued)

OTHER PUBLICATIONS

European Search Report dated Nov. 5, 2021 as received in application No. 19865412.1.
(Continued)

*Primary Examiner* — Sharmin Chowdhury
(74) *Attorney, Agent, or Firm* — Brooks Kushman P.C.

(57) ABSTRACT

A method for determining a sidelink resource and a device are provided. The method includes: determining, based on at least one of preset information and a preset parameter, a target sidelink SL resource for a target SL service from candidate SL resources; where the preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources.

18 Claims, 2 Drawing Sheets

---

Determine, based on the preset information, a first SL resource for the target SL service from the candidate SL resources — S201

Determine, when a preset parameter of the first SL resource and a preset parameter of a second SL resource satisfy a preset condition, the second SL resource as the target SL resource, where the second SL resource is an SL resource in the candidate SL resources. — S202

(56) References Cited

U.S. PATENT DOCUMENTS

| | | |
|---|---|---|
| 2019/0335532 A1 | 10/2019 | Kim et al. |
| 2020/0221467 A1 | 7/2020 | Huang et al. |
| 2020/0229194 A1* | 7/2020 | Belleschi .............. H04L 5/0064 |
| 2021/0006954 A1 | 1/2021 | Xu et al. |
| 2021/0120528 A1* | 4/2021 | Peng ...................... H04W 4/44 |
| 2021/0168766 A1* | 6/2021 | Su ..................... H04W 72/0453 |
| 2021/0168814 A1* | 6/2021 | Chen .................... H04W 72/02 |
| 2021/0195593 A1* | 6/2021 | Shen ........................ H04L 5/14 |
| 2021/0329596 A1* | 10/2021 | Freda ................. H04W 72/541 |

FOREIGN PATENT DOCUMENTS

| | | |
|---|---|---|
| WO | 2017/026409 A1 | 2/2017 |
| WO | 2018/062967 A2 | 4/2018 |
| WO | 2018/064452 A1 | 4/2018 |
| WO | 2018/117775 A1 | 6/2018 |
| WO | 2019/061195 A1 | 4/2019 |

OTHER PUBLICATIONS

CMCC, "Considerations on cross carrier configuration," 3GPP TSG-RAN WG2 Meeting #97, R2-1701916, pp. 1-3, (Feb. 17, 2017).

Huawei., "Summary of [99#48][eV2X] Selection of Tx carriers," 3GPP TSG-RAN WG2 Meeting #99bis, R2-1710089, pp. 1-26, (Oct. 13, 2017).

Written Opinion of the International Searching Authority dated Apr. 8, 2021 as received in Application No. PCT/CN2019/106936.

JP Office Action dated May 10, 2022 as received in Application No. 2021-517377.

\* cited by examiner

FIG. 5

METHOD FOR DETERMINING SIDELINK RESOURCE AND DEVICE

CROSS-REFERENCE TO RELATED APPLICATIONS

This application is a continuation application of a PCT Application No. PCT/CN2019/106936 filed on Sep. 20, 2019, which claims priority to Chinese Patent Application No. 201811134305.6 filed in China on Sep. 27, 2018, the disclosures of which are incorporated herein by reference in their entireties.

TECHNICAL FIELD

The present disclosure relates to the field of communications technologies, and more specifically, to a method for determining a sidelink resource and a device.

BACKGROUND

A sidelink (SL) is used for direct data transmission between terminal devices (UE) without going through a network device. In a long term evolution (LTE) system, UE determines an SL resource in two modes: a scheduled resource allocation (Scheduled resource allocation) mode, in which a network device allocates an SL resource to the UE; and an autonomous resource selection (autonomous resource selection) mode, in which the UE autonomously selects an SL resource.

A solution of the related art in which the UE determines the SL resource in the autonomous resource selection mode has a defect in that SL resource utilization is not ideal.

SUMMARY

Embodiments of the present disclosure provide a method for determining a sidelink resource and a device, to improve SL resource utilization.

According to a first aspect, a method for determining a sidelink resource is provided, which is applied to a terminal device. The method includes: determining, based on at least one of preset information and a preset parameter, a target sidelink SL resource for a target SL service from candidate SL resources; where the preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources.

According to a second aspect, a terminal device is provided. The terminal device includes:

a resource determining module, configured to determine, based on at least one of preset information and a preset parameter, a target sidelink SL resource for a target SL service from candidate SL resources; where the preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources.

According to a third aspect, a terminal device is provided. The terminal device includes a memory, a processor, and a wireless communication program stored on the memory and capable of running on the processor, where when the wireless communication program is executed by the processor, the steps of the method according to the first aspect are implemented.

According to a fourth aspect, a computer-readable medium is provided. The computer-readable medium stores a wireless communication program, where when the wireless communication program is executed by a processor, the steps of the method according to the first aspect are implemented.

In the embodiments of the present disclosure, the terminal device may determine, based on at least one of preset information and a preset parameter, a target SL resource for a target SL service from candidate SL resources; where the preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources. It can be learned that in the embodiments of the present disclosure, the target SL resource is determined by taking impact of factors into account such as the related information of the resource used by the Uu interface, the attribute of the carrier carrying the target SL resource, the utilization rate of the candidate SL resources, and the communication quality parameter of the candidate SL resources. Therefore, utilization of SL resources can be improved, and the terminal device can make a more proper and better use of the SL resources.

BRIEF DESCRIPTION OF DRAWINGS

To describe the technical solutions in the embodiments of the present disclosure or in the related art more clearly, the following briefly describes the accompanying drawings required for describing the embodiments or the related art. Apparently, the accompanying drawings in the following description show merely some of the embodiments recorded in the present disclosure, and a person of ordinary skill in the art may still derive other drawings from these accompanying drawings without creative efforts.

DETAILED DESCRIPTION OF EMBODIMENTS

To help a person in the technical field better understand the technical solutions in the present disclosure, the following clearly describes the technical solutions in the embodiments of the present disclosure with reference to the accompanying drawings in the embodiments of the present disclosure. It is clear that, the described embodiments are merely some rather than all of the embodiments of the present disclosure. Based on the embodiments of the present disclosure, all other embodiments derived by those of ordinary skill in the art without creative efforts shall fall within the scope of protection of the present disclosure.

It should be understood that the technical solutions in the embodiments of the present disclosure can be applied to various communications systems, such as a global system for mobile communications (GSM) system, a code division multiple access (CDMA) system, a wideband code division multiple access (WCDMA) system, general packet radio service (GPRS), a long term evolution (LTE) system, an LTE frequency division duplex (FDD) system, LTE time division duplex (TDD), a universal mobile telecommunications system (UMTS) or a worldwide interoperability for microwave access (WiMAX) communications system, or a 5th generation (5G) communications system, also referred to as a new radio (NR) system.

A terminal device (UE), which may also be referred to as a mobile terminal (Mobile Terminal), a mobile terminal device, or the like, can communicate with at least one core network via a radio access network (for example, Radio Access Network, RAN). The terminal device may be a mobile terminal, for example, a mobile phone (or referred to as a "cellular" phone) and a computer having a mobile terminal. For example, the terminal device may be a portable, pocket-sized, handheld, computer built-in, or vehicle-mounted mobile apparatus. These devices exchange voice and/or data with the radio access network.

A network device is an apparatus deployed in a radio access network to allocate resources for terminal devices. The network device may be a base transceiver station (BTS) in GSM or CDMA, or may be a NodeB (NodeB) in WCDMA, or may be an evolved NodeB (eNB or e-NodeB) in LTE, a 5G base station (gNB), and a network side device in a subsequent evolved communications system. However, these terms do not constitute any limitation to the scope of protection of the present disclosure.

It should be noted that during description of specific embodiments, the sequence number of each process does not mean the order of execution. The order of execution of each process should be determined by its function and internal logic, and should not constitute any limitation to the implementation process of the embodiments of the present disclosure.

It should be noted that the following merely takes a 5G system as an example to illustrate a method for determining a sidelink resource and a device that are provided in the embodiments of the present disclosure. It should be understood that the method for determining a sidelink resource and the device that are provided in the embodiments of the present disclosure can also be applied to other communications systems and is not limited to the 5G system.

It should also be noted that the described objects connected by "and/or" in the embodiments of the present disclosure may be understood as at least one of the two objects connected by "and/or".

A method for determining a sidelink resource that is applied to a terminal device is first described below with reference to FIG. 1.

Figure 1:
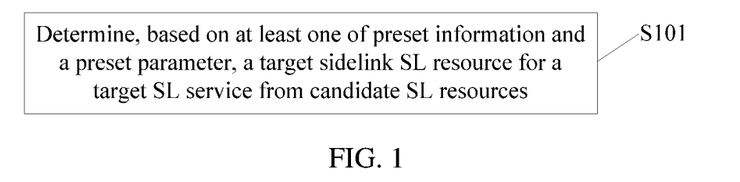
FIG. 1 is a schematic flowchart of a method for determining a sidelink resource according to an embodiment of the present disclosure.

FIG. 1 shows a method for determining a sidelink resource according to an embodiment of the present disclosure, which is applied to a terminal device. As shown in FIG. 1, the method may include the following step:

Step 101: Determine, based on at least one of preset information and a preset parameter, a target sidelink SL resource for a target SL service from candidate SL resources.

The preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources. The Uu interface is a user-to-network universal (user to network universal, Uu) interface. The above-mentioned preset information is described below in more detail with reference to specific implementations, and refer to the following for details.

The target SL service may be a service in which one terminal device discovers another terminal device through a sidelink (SL) (hereinafter referred to as a discovery service), or may be a service of data transmission from one terminal device to another terminal device through an SL (hereinafter referred to as a transmission service).

The candidate SL resources may be resources in a resource pool (pool) pre-configured by the network side for the purpose of an SL service. Generally, in addition to resources used for the discovery service or the transmission service, the resource pool pre-configured by the network side for the terminal device for the purpose of the SL service may further include parameters related to the transmission service. For example, the following parameters may further be included, such as: an offset value of the first subframe of the resource pool, a bitmap (bitmap) corresponding to the resource pool, whether a physical sidelink control channel (PSCCH) and a physical sidelink shared channel (PSSCH) are to be transmitted on contiguous resource blocks (RB), a quantity of sub-channels and a size of each sub-channel as well as a minimum RB index value corresponding to the sub-channels, a minimum RB index value corresponding to a PSCCH resource pool, a channel busy rate (CBR), a measured sidelink received signal strength indicator (SL-RSSI) threshold, and an area identifier.

Optionally, the resource pool configured by the network side for the terminal device for the purpose of the SL service may be a normal resource pool, or an exceptional resource pool may be configured in addition to the normal resource pool. The exceptional resource pool may be used in some special cases, for example, applied to procedures such as the use of resource switching, a radio link failure (RLF), and switching from idle (IDLE) mode to connected (CONNECTED) mode.

The target SL resource is an SL resource required for processing the target SL service.

In practical applications, the terminal device may perform the foregoing step 101 when the terminal device is prepared to process the target SL service, or when a target SL resource determined by the terminal device for the target SL service based on other methods does not meet requirements and a target SL resource for the target SL resource needs to be re-determined.

In this embodiment of the present disclosure, the terminal device determines the target SL resource for the target SL service by taking impact of at least one factor into account in the related information of the resource used by the Uu interface, the attribute of the carrier carrying the target SL resource, the utilization rate of the candidate SL resources, and the communication quality parameter of the candidate SL resources. Therefore, utilization of SL resources in the terminal device can be improved, and the terminal device can make a more proper and better use of the SL resources.

The method for determining a sidelink resource that is provided in this embodiment of the present disclosure is described below with reference to specific implementations.

In a first specific implementation, step 101 may include: determining, based on the preset information, the target sidelink SL resource for the target SL service from the candidate SL resources.

As an example, in the first specific implementation described above, the candidate SL resources in step 101 include SL resources that are located on a supplementary uplink (SUL) carrier and a non-SUL carrier respectively and have same quality of service (QoS) parameters, the preset information includes the related information of the resource used by the Uu interface, and the related information includes information about an SL resource used by the Uu interface.

If the network side configures two uplink carriers for a cell (cell), one of which is a normal carrier (or referred to as a non-SUL carrier), the other is an SUL carrier. In general, coverage performance of the SUL carrier is better than coverage performance of the non-SUL carrier, and the SUL carrier can be used to improve carrier coverage of an NR system.

The QoS parameter may specifically include but is not limited to one or more of the following parameters: a service priority, a latency (latency) of a data packet or data stream, reliability (Reliability) of a data packet or data stream, a communication range (communication range) of a data packet or data stream, a size (payload) of a data packet or data stream, a transmission rate (transmission range) of a data packet or data stream, or a data rate (Data rate) of a data packet or data stream.

Correspondingly, step 101 may specifically include: determining, as the target SL resource based on the preset information, an SL resource in the candidate SL resources that is used by the Uu interface.

Specifically, if the SL resource used by the Uu interface is the SUL carrier, the SUL carrier is determined as the target SL resource; and if the SL resource used by the Uu interface is the non-SUL carrier, the non-SUL carrier is determined as the target SL resource.

This example is intended to illustrate that, if there are SL resources with same QoS on an SUL carrier and a non-SUL carrier that are configured for a cell, the terminal device may determine the target SL resource by considering whether the Uu interface is currently operating on the SUL carrier or the non-SUL carrier. Specifically, an SL resource on the carrier on which the Uu interface is currently operating is determined as the target SL resource, which can reduce carrier switching and improve communication efficiency.

As another example, in the first specific implementation described above, the preset information in step 101 includes the related information of the resource used by the Uu interface, and the related information includes information indicating activation or deactivation of an SL resource used by the Uu interface.

Correspondingly, step 101 may specifically include: determining, as the target SL resource based on the preset information, an SL resource in the candidate SL resources that is used by the Uu interface and is in an active state.

More specifically, an SL resource corresponding to a secondary cell (Scell) or a bandwidth part (BWP) in the candidate SL resources that is used by the Uu interface and is in an active state may be determined as the target SL resource.

This example is intended to illustrate that, because Scells or BWPs on different carriers have two different states: active or inactive, if carriers used by an SL resource and the Uu interface are the same and form a hybrid carrier, the target SL resource may be determined based on whether the resource used by the Uu interface is activated or deactivated. Specifically, the SL resource corresponding to the secondary cell Scell or the bandwidth part BWP in the candidate SL resources that is used by the Uu interface and is in an active state may be determined as the target SL resource. This can reduce radio frequency changes (RF change) of the terminal device.

As still another example, in the first specific implementation described above, the preset information in step 101 includes the related information of the resource used by the Uu interface, and the related information includes information about interference caused by the resource used by the Uu interface to the candidate SL resources.

Correspondingly, step 101 may specifically include: determining, as the target SL resource based on the preset information, an SL resource with a degree of interference that is caused by the resource used by the Uu interface and is less than a first threshold, in the candidate SL resources.

The interference caused by the resource used by the Uu interface to the candidate SL resources may be harmonic distortion, inter-modulation distortion, or adjacent frequency leakage.

This example is intended to illustrate that, when the Uu interface operates (for example, sends or receives data) on a resource of a specific frequency, interference to a resource of another frequency may be caused; therefore, the target SL resource may be determined based on the degree of interference caused by the resource used by the Uu interface to the candidate SL resources. Specifically, a candidate SL resource with the degree of interference that is caused by the resource used by the Uu interface and is less than a specific threshold may be determined as the target SL resource. This can reduce interference received when the terminal device uses the target SL resource to process the target SL service, ensuring that the target SL service is processed smoothly.

As yet another example, in the first specific implementation described above, the candidate SL resources in step 101 may include resources in an SL resource pool corresponding to different radio access technologies (RAT) supported by the terminal device, the preset information includes the related information of the resource used by the Uu interface, and the related information includes information about a RAT selected by the Uu interface.

Correspondingly, step 101 may specifically include: determining, based on the preset information, a target RAT selected by the Uu interface; and determining the target SL resource from an SL resource pool that corresponds to the target RAT, in the candidate SL resources.

In this example, the target SL resource is determined based on a RAT currently selected by the Uu interface, and this can avoid the need of RAT handover due to inconsistency between a RAT corresponding to the determined target SL resource and the RAT currently selected by the Uu interface.

As still yet another example, in the first specific implementation described above, the preset information in step 101 includes the attribute of the carrier carrying the target SL resource, and the method for determining a sidelink resource that is provided in this embodiment of the present disclosure may further include: determining, based on at least one of characteristic information of the terminal device and characteristic information of the target SL service, the attribute of the carrier carrying the target SL resource.

The attribute of the carrier may be represented by a subcarrier spacing (SCS) or a BWP. The characteristic information of the terminal device may include but is not limited to a movement speed of the terminal device. The characteristic information of the target SL service may include but is not limited to either of information about a priority of the target SL service and information about a logical channel carrying the target SL service.

For example, in general, if the attribute of the carrier is represented by the SCS, the faster the terminal device moves or the higher the priority of the target SL service, the larger the SCS of the carrier of the correspondingly determined target SL resource; if the attribute of the carrier is represented by the BWP, the faster the terminal device moves, a BWP having an identifier of a terminal device supporting high-speed movement is correspondingly selected as the attribute of the carrier of the target SL resource. In practical applications, a correspondence between the characteristic information of the terminal device or the characteristic information of the target SL service and the attribute of the carrier carrying the target SL resource may be pre-established, and then the attribute of the carrier carrying the target SL resource is determined based on the correspondence.

Correspondingly, step 101 above may include: determining, as the target SL resource based on the preset information, an SL resource in the candidate SL resources that has the attribute.

In this example, the target SL resource is determined based on the attribute of the carrier carrying the target SL resource, which can meet the requirement for a specific SL resource by a specific SL service or an SL service carried on a specific logical channel.

In a second specific implementation, step 101 may include: determining, based on the preset information and the preset parameter, the target sidelink SL resource for the target SL service from the candidate SL resources.

Figure 2:
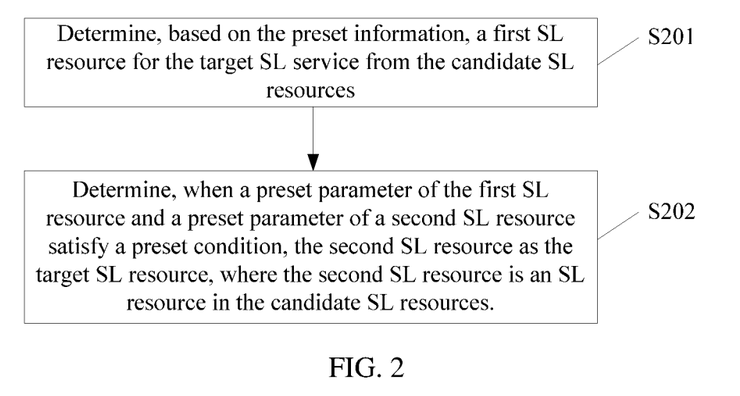
FIG. 2 is a detailed flowchart of step 101 in the embodiment shown in FIG. 1.

For example, as shown in FIG. 2, step 101 may include the following substeps:

Substep 201: Determine, based on the preset information, a first SL resource for the target SL service from the candidate SL resources.

It should be noted that a manner of determining the first SL resource in substep 201 is correspondingly consistent with the manner of determining the target SL resource in the first specific implementation described above. To avoid repetition, details are not described herein again.

Substep 202: Determine, when a preset parameter of the first SL resource and a preset parameter of a second SL resource satisfy a first preset condition, the second SL resource as the target SL resource, where the second SL resource is an SL resource in the candidate SL resources.

Optionally, if the preset parameter of the first SL resource and the preset parameter of the second SL resource do not satisfy the above-mentioned first preset condition, the first SL resource is determined as the target SL resource.

In this implementation, the second SL resource is a resource different from the first SL resource in the candidate SL resources. In other words, the second SL resource is a candidate SL resource that is not selected as the first SL resource. As an example, the second SL resource may be a part or all of SL resources in the candidate SL resources except the first SL resource.

As described above, the preset parameter may include but is not limited to at least one of the utilization rate of the candidate SL resources and the communication quality parameter of the candidate SL resources.

Correspondingly, in an example, if the preset parameter includes the utilization rate of the candidate SL resources, substep 202 may include: when a utilization rate of the first SL resource is higher than a utilization rate of the second SL resource by a second threshold, determining the second SL resource as the target SL resource.

The resource utilization rate may be determined based on a channel busy rate (CBR). Correspondingly, in this example, when the resource utilization rate is represented by a CBR, if a CBR of the first SL resource is higher than a CBR of the second SL resource by the second threshold, the second SL resource is determined as the target SL resource.

Specifically, assuming that the CBR of the first SL resource is equal to a, the CBR of the second SL resource is equal to b, and the second threshold is c, then a−b>c, where a, b, and c are all greater than or equal to 0.

Because the resource utilization rate reflects the degree of the resource being busy, a larger resource utilization rate (larger CBR) indicates that the resource is busier; otherwise, the resource is less busy. Therefore, it can be understood that this example is intended to illustrate that, after the first SL resource for the target SL service is determined based on substep 201, the first SL resource is not directly used as the target SL resource, but it needs to be further determined whether an SL resource in the candidate SL resources that is not selected as the first SL resource is less busy. If the first SL resource is much busier than the second SL resource, the second SL resource is selected as the target SL resource; otherwise, the first SL resource is used as the target SL resource. In this way, the finally determined target SL resource can ensure that the target SL service is better processed.

In another example, if the preset parameter includes the communication quality parameter of the candidate SL resources, substep 202 may include: when a communication quality parameter of the first SL resource is lower than a communication quality parameter of the second SL resource by a third threshold, determining the second SL resource as the target SL resource.

The communication quality parameter may include but is not limited to reference signal received power (RSRP) and reference signal received quality (RSRQ).

Specifically, assuming that the communication quality parameter of the first SL resource is equal to d, the communication quality parameter of the second SL resource is equal to e, and the third threshold is f, then e−d>f, where d, e, and f are all greater than or equal to 0.

Because the communication quality parameter reflects the performance of the resource, a higher communication quality parameter of a resource indicates that the performance of the resource is better; otherwise, the performance of the resource is worse. Therefore, it can be understood that this example is intended to illustrate that, after the first SL resource for the target SL service is determined based on substep 201, the first SL resource is not directly used as the target SL resource, but it needs to be further determined whether an SL resource in the candidate SL resources that is not selected as the first SL resource is better in performance. If the first SL resource is worse than the second SL resource in performance, the second SL resource is selected as the target SL resource; otherwise, the first SL resource is used as the target SL resource. In this way, the finally determined target SL resource can ensure that the target SL service is better processed.

In a third specific implementation, step 101 may include: determining, based on the preset parameter, the target sidelink SL resource for the target SL service from the candidate SL resources.

Specifically, step 101 may include: determining, as the target SL resource, an SL resource in the candidate SL resources for which the preset parameter satisfies a second preset condition.

For example, if the preset parameter is the utilization rate of the candidate SL resources, an SL resource with a utilization rate that is the lowest or lower than a specific threshold in the candidate SL resources may be determined as the target SL resource.

For another example, if the preset parameter is the communication quality parameter of the candidate SL resources, an SL resource with a communication quality parameter that is the highest or higher than a specific threshold in the candidate SL resources may be determined as the target SL resource.

The method for determining a sidelink resource that is applied to a terminal device is described above. The terminal device according to the embodiments of the present disclosure is described in detail below with reference to FIG. 3 and FIG. 4.

Figure 3:
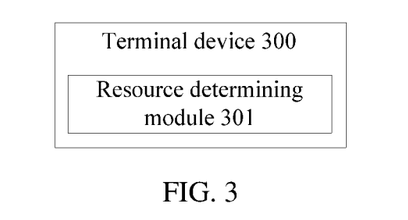
FIG. 3 is a schematic structural diagram of a terminal device 300 according to an embodiment of the present disclosure.

FIG. 3 shows a schematic structural diagram of a terminal device according to an embodiment of the present disclosure. As shown in FIG. 3, the terminal device 300 includes: a resource determining module 301.

The resource determining module 301 is configured to determine, based on at least one of preset information and a preset parameter, a target sidelink SL resource for a target SL service from candidate SL resources.

The preset information includes either of related information of a resource used by a Uu interface of the terminal device and an attribute of a carrier carrying the target SL resource; and the preset parameter includes at least one of a utilization rate of the candidate SL resources and a communication quality parameter of the candidate SL resources.

In this embodiment of the present disclosure, the terminal device determines the target SL resource for the target SL service by taking impact of at least one factor into account in the related information of the resource used by the Uu interface, the attribute of the carrier carrying the target SL resource, the utilization rate of the candidate SL resources, and the communication quality parameter of the candidate SL resources. Therefore, utilization of SL resources in the terminal device can be improved, and the terminal device can make a more proper and better use of the SL resources.

The terminal device 300 provided in this embodiment of the present disclosure is described below with reference to specific implementations.

In a first specific implementation, the resource determining module 301 in the terminal device 300 may be configured to determine, based on the preset information, the target sidelink SL resource for the target SL service from the candidate SL resources.

As an example, in the first specific implementation described above, the candidate SL resources of the resource determining module 301 include SL resources that are located on an SUL carrier and a non-SUL carrier respectively and have same QoS parameters, the preset information includes the related information of the resource used by the Uu interface, and the related information includes information about an SL resource used by the Uu interface.

Correspondingly, the resource determining module 301 may be specifically configured to: determine, as the target SL resource based on the preset information, an SL resource in the candidate SL resources that is used by the Uu interface.

Specifically, if the SL resource used by the Uu interface is the SUL carrier, the SUL carrier is determined as the target SL resource; and if the SL resource used by the Uu interface is the non-SUL carrier, the non-SUL carrier is determined as the target SL resource.

This example is intended to illustrate that, if there are SL resources with same QoS on an SUL carrier and a non-SUL carrier that are configured for a cell, the terminal device may determine the target SL resource by considering whether the Uu interface is currently operating on the SUL carrier or the non-SUL carrier. Specifically, an SL resource on the carrier on which the Uu interface is currently operating is determined as the target SL resource, which can reduce carrier switching and improve communication efficiency.

As another example, in the first specific implementation described above, the preset information in the resource determining module 301 includes the related information of the resource used by the Uu interface, and the related information includes information indicating activation or deactivation of an SL resource used by the Uu interface.

Correspondingly, the resource determining module 301 may be specifically configured to: determine, as the target SL resource based on the preset information, an SL resource in the candidate SL resources that is used by the Uu interface and is in an active state.

More specifically, an SL resource corresponding to an Scell or a BWP in the candidate SL resources that is used by the Uu interface and is in an active state may be determined as the target SL resource.

This example is intended to illustrate that, because Scells or BWPs on different carriers have two different states: active or inactive, if an SL resource and a carrier used by the Uu interface are located on the same carrier to form a hybrid carrier, the target SL resource may be determined based on whether the resource used by the Uu interface is activated or deactivated. Specifically, the SL resource corresponding to the secondary cell Scell or the bandwidth part BWP in the candidate SL resources that is used by the Uu interface and is in an active state may be determined as the target SL resource. This can reduce radio frequency changes (RF change) of the terminal device.

As still another example, in the first specific implementation described above, the preset information in the resource determining module 301 includes the related information of the resource used by the Uu interface, and the related information includes information about interference caused by the resource used by the Uu interface to the candidate SL resources.

Correspondingly, the resource determining module 301 may be specifically configured to: determine, as the target SL resource based on the preset information, an SL resource with a degree of interference that is caused by the resource used by the Uu interface and is less than a first threshold, in the candidate SL resources.

The interference caused by the resource used by the Uu interface to the candidate SL resources may be harmonics, focal tone, or adjacent frequency leakage.

This example is intended to illustrate that, when the Uu interface operates (for example, sends or receives data) on a resource of a specific frequency, interference to a resource of another frequency may be caused; therefore, the target SL resource may be determined based on the degree of interference caused by the resource used by the Uu interface to the candidate SL resources. Specifically, a candidate SL resource with the degree of interference that is caused by the resource used by the Uu interface and that is less than a specific threshold may be determined as the target SL resource. This can reduce interference received when the terminal device uses the target SL resource to process the target SL service, ensuring that the target SL service is processed smoothly.

As yet another example, in the first specific implementation described above, the candidate SL resources in the resource determining module 301 may include resources in an SL resource pool corresponding to different radio access technologies RAT supported by the terminal device, the preset information includes the related information of the resource used by the Uu interface, and the related information includes information about a RAT selected by the Uu interface.

Correspondingly, the resource determining module 301 may be specifically configured to: determine, based on the preset information, a target RAT selected by the Uu interface; and determine the target SL resource from an SL resource pool that corresponds to the target RAT, in the candidate SL resources.

In this example, the target SL resource is determined based on a RAT currently selected by the Uu interface, and this can avoid the need of RAT handover due to inconsistency between a RAT corresponding to the determined target SL resource and the RAT currently selected by the Uu interface.

As still yet another example, in the first specific implementation described above, the preset information in the resource determining module 301 includes the attribute of the carrier carrying the target SL resource, and the method for determining a sidelink resource that is provided in this embodiment of the present disclosure may further include: determining, based on at least one of characteristic information of the terminal device and characteristic information of the target SL service, the attribute of the carrier carrying the target SL resource.

The attribute of the carrier may be represented by an SCS or a BWP. The characteristic information of the terminal device may include but is not limited to a movement speed of the terminal device. The characteristic information of the target SL service may include but is not limited to either of information about a priority of the target SL service and information about a logical channel carrying the target SL service.

For example, in general, if the attribute of the carrier is represented by the SCS, the faster the terminal device moves or the higher the priority of the target SL service, the larger the SCS of the carrier of the correspondingly determined target SL resource; if the attribute of the carrier is represented by the BWP, the faster the terminal device moves, a BWP having an identifier of a terminal device supporting high-speed movement is correspondingly selected as the attribute of the carrier of the target SL resource. In practical applications, a correspondence between the characteristic information of the terminal device or the characteristic information of the target SL service and the attribute of the carrier carrying the target SL resource may be pre-established, and then the attribute of the carrier carrying the target SL resource is determined based on the correspondence.

Correspondingly, the foregoing resource determining module 301 may be configured to: determine, as the target SL resource based on the preset information, an SL resource in the candidate SL resources that has the attribute.

In this example, the target SL resource is determined based on the attribute of the carrier carrying the target SL resource, which can meet the requirement for a specific SL resource by a specific SL service or an SL service carried on a specific logical channel.

In a second specific implementation, the resource determining module 301 may be configured to: determine, based on the preset information and the preset parameter, the target sidelink SL resource for the target SL service from the candidate SL resources.

Figure 4:
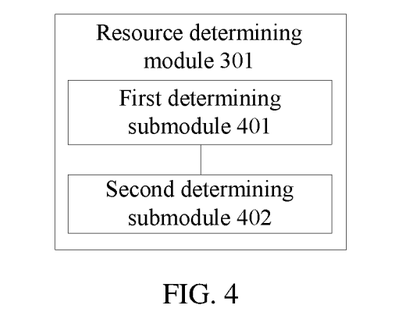
FIG. 4 is a detailed schematic structural diagram of a module 301 in the embodiment shown in FIG. 3.

For example, as shown in FIG. 4, the resource determining module 301 may include the following submodules:

A first determining submodule 401 is configured to determine, based on the preset information, a first SL resource for the target SL service from the candidate SL resources.

It should be noted that a manner of determining the first SL resource in the first determining submodule 401 is correspondingly consistent with the manner of determining the target SL resource in the first specific implementation described above. To avoid repetition, details are not described herein again.

A second determining submodule 402 is configured to determine, when a preset parameter of the first SL resource and a preset parameter of a second SL resource satisfy a first preset condition, the second SL resource as the target SL resource, where the second SL resource is an SL resource in the candidate SL resources.

Optionally, if the preset parameter of the first SL resource and the preset parameter of the second SL resource do not satisfy the above-mentioned first preset condition, the first SL resource is determined as the target SL resource.

In this implementation, the second SL resource is a resource different from the first SL resource in the candidate SL resources. In other words, the second SL resource is a candidate SL resource that is not selected as the first SL resource. As an example, the second SL resource may be a part or all of SL resources in the candidate SL resources except the first SL resource.

As described above, the preset parameter may include but is not limited to at least one of the utilization rate of the candidate SL resources and the communication quality parameter of the candidate SL resources.

Correspondingly, in an example, if the preset parameter includes the utilization rate of the candidate SL resources, the second determining submodule 402 may be configured to: when a utilization rate of the first SL resource is higher than a utilization rate of the second SL resource by a second threshold, determine the second SL resource as the target SL resource.

The resource utilization rate may be determined based on a CBR.

Because the resource utilization rate reflects the degree of the resource being busy, a larger resource utilization rate (larger CBR) indicates that the resource is busier; otherwise, the resource is less busy. Therefore, it can be understood that this example is intended to illustrate that, after the first SL resource for the target SL service is determined based on the first determining submodule 401, the first SL resource is not directly used as the target SL resource, but it needs to be further determined whether an SL resource in the candidate SL resources that is not selected as the first SL resource is less busy. If the first SL resource is much busier than the second SL resource, the second SL resource is selected as the target SL resource; otherwise, the first SL resource is used as the target SL resource. In this way, the finally determined target SL resource can ensure that the target SL service is better processed.

In another example, if the preset parameter includes the communication quality parameter of the candidate SL resources, the second determining submodule 402 may be configured to: when a communication quality parameter of the first SL resource is lower than a communication quality parameter of the second SL resource by a third threshold, determine the second SL resource as the target SL resource.

The communication quality parameter may include but is not limited to RSRP and RSRQ.

Because the communication quality parameter reflects the performance of the resource, a higher communication quality parameter of a resource indicates that the performance of the resource is better; otherwise, the performance of the resource is worse. Therefore, it can be understood that this example is intended to illustrate that, after the first SL resource for the target SL service is determined based on the first determining submodule 401, the first SL resource is not directly used as the target SL resource, but it needs to be further determined whether an SL resource in the candidate SL resources that is not selected as the first SL resource is better in performance. If the first SL resource is worse than the second SL resource in performance, the second SL resource is selected as the target SL resource; otherwise, the first SL resource is used as the target SL resource. In this way, the finally determined target SL resource can ensure that the target SL service is better processed.

In a third specific implementation, the resource determining module 301 may be configured to: determine, based on the preset parameter, the target sidelink SL resource for the target SL service from the candidate SL resources.

Specifically, the resource determining module 301 may be configured to: determine, as the target SL resource, an SL resource in the candidate SL resources for which the preset parameter satisfies a second preset condition.

For example, if the preset parameter is the utilization rate of the candidate SL resources, an SL resource with a utilization rate that is the lowest or lower than a specific threshold in the candidate SL resources may be determined as the target SL resource.

For another example, if the preset parameter is the communication quality parameter of the candidate SL resources, an SL resource with a communication quality parameter that is the highest or higher than a specific threshold in the candidate SL resources may be determined as the target SL resource.

The foregoing terminal device 300 shown in FIG. 3 can be used to implement the various embodiments of the foregoing method for determining a sidelink resource shown in FIG. 1. For related details, refer to the foregoing method embodiments.

Figure 5:
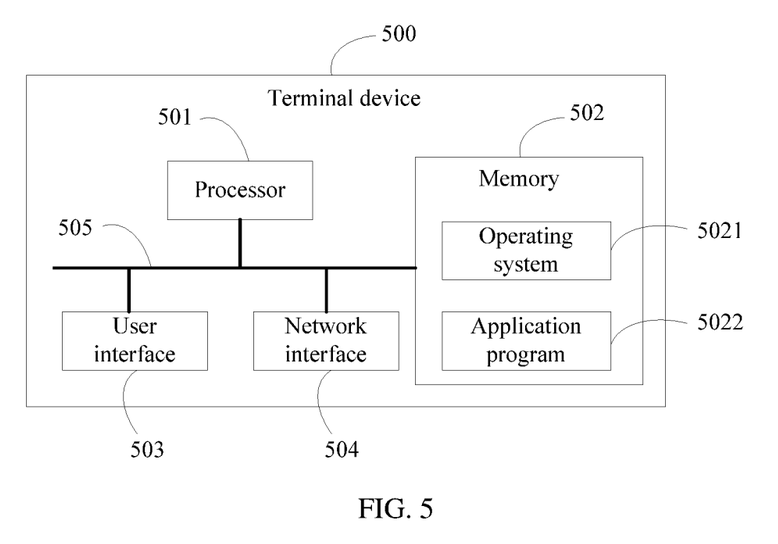
FIG. 5 is a schematic structural diagram of a terminal device 500 according to an embodiment of the present disclosure.

FIG. 5 is a schematic structural diagram of a terminal device according to another embodiment of the present disclosure. The terminal device 500 shown in FIG. 5 includes: at least one processor 501, a memory 502, at least one network interface 504, and a user interface 503. The various components in the terminal device 500 are coupled together through a bus system 505. It can be understood that the bus system 505 is used to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, or a clicking device (for example, a mouse, a trackball (trackball), a touch panel, or a touchscreen).

It can be understood that the memory 502 in this embodiment of the present disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example instead of restrictive description, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 502 of the system and method described in the embodiments of the present disclosure is intended to include but is not limited to these and any other suitable types of memories.

In some embodiments, the memory 502 stores the following elements, executable modules or data structures, or a subset thereof, or an extended set thereof: an operating system 5021 and an application program 5022.

The operating system 5021 includes various system programs, such as a framework layer, a kernel library layer, and a driver layer, for implementing various basic services and processing hardware-based tasks. The application program 5022 includes various application programs, such as a media player (Media Player) and a browser (Browser), which are used to implement various application services. A program for implementing the method in the embodiments of the present disclosure may be included in the application program 5022.

In this embodiment of the present disclosure, the terminal device 500 further includes: a computer program stored on the memory 502 and capable of running on the processor 501. When the computer program is executed by the processor 501, the processes of the foregoing method for determining a sidelink resource are implemented, with the same technical effects achieved. To avoid repetition, details are not described herein again.

The method disclosed in the foregoing embodiments of the present disclosure may be applied to the processor 501 or implemented by the processor 501. The processor 501 may be an integrated circuit chip, having a signal processing capability. During implementation, the steps of the foregoing method can be completed by hardware integrated logic circuits in the processor 501 or instructions in the form of software. The foregoing processor 501 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 501 can implement or perform the methods, steps, and logical block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 502, and the processor 501 reads information in the memory 502, and completes the steps of the foregoing method in combination with its hardware. Specifically, the computer-readable storage medium stores a computer program, and when the computer program is executed by the processor 501, the steps in the embodiment of the foregoing method for determining a sidelink resource are implemented.

It can be understood that the embodiments described in the embodiments of the present disclosure may be implemented by hardware, software, firmware, middleware, microcode, or a combination thereof. For hardware implementation, the processing unit can be implemented in at least one application-specific integrated circuit (ASIC), digital signal processor (DSP), digital signal processing device (DSP Device, DSPD), programmable logic device (PLD), field-programmable gate array (FPGA), general-purpose processor, controller, microcontroller, microprocessor, and other electronic units for performing the functions described in this disclosure, or combinations thereof.

For software implementation, the techniques described in the embodiments of the present disclosure may be implemented by modules (for example, processes or functions) that perform the functions described in the embodiments of the present disclosure. Software codes can be stored in the memory and executed by the processor. The memory can be implemented inside or outside the processor.

An embodiment of the present disclosure further provides a computer-readable storage medium, where the computer-readable storage medium stores a computer program. When the computer program is executed by a processor, the processes of the embodiment of the foregoing method for determining a sidelink resource are implemented, with the same technical effects achieved. To avoid repetition, details are not described again herein. The computer-readable storage medium is, for example, a read-only memory (ROM for short), a random access memory (RAM for short), a magnetic disk, or an optical disc.

An embodiment of the present disclosure further provides a computer program product including instructions. When a computer runs the instructions of the computer program product, the computer performs the foregoing method for determining a sidelink resource. Specifically, the computer program product is capable of running on the foregoing network device.

A person of ordinary skill in the art may be aware that the units and algorithmic steps in the examples described with reference to the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

For the several embodiments provided in the present disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in the embodiments of the present disclosure. The above-mentioned storage medium includes various media that can store program code, such as: a USB flash drive, a removable hard disk, a read-only memory (ROM), a random access memory (RAM), a magnetic disk, or an optical disc.

A person of ordinary skill in the art may understand that all or some of the processes of the methods in the foregoing embodiments may be implemented by a computer program controlling related hardware. The program may be stored in a computer-readable storage medium, and when the program runs, the processes of the methods in the embodiments can be included. The storage medium may be a magnetic disk, an optical disc, a ROM, a RAM, or the like.

The foregoing descriptions are merely specific implementations of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

What is claimed is:

1. A method for determining a sidelink resource, applied to a terminal device, wherein the method comprises:
    determining, based on preset information or based on preset information and a preset parameter, a target sidelink (SL) resource for a target SL service from candidate SL resources; wherein
    wherein the preset information comprises a related information of the resource used by a Uu interface of the terminal device, and the related information comprises information indicating activation or deactivation of an SL resource used by the Uu interface and information about a radio access technologies (RAT) selected by the Uu interface; and wherein the preset parameter comprises at least one of a utilization rate of the candidate SL resources and a communication quality parameter of the candidate SL resources;

determining, as the target SL resource based on the preset information, an SL resource in the candidate SL resources that is used by the Uu interface and is in an active state;

determining, based on the preset information, a target RAT selected by the Uu interface; and determining the SL resource as the target SL resource from an SL resource pool that corresponds to the target RAT, in the candidate SL resources.

2. The method according to claim 1, wherein the candidate SL resources comprise SL resources that are located on a supplementary uplink (SUL) carrier and a non-SUL carrier respectively and have same quality of service (QoS) parameters, the preset information comprises the related information of the resource used by the Uu interface, and the related information comprises information about an SL resource used by the Uu interface; and the determining, based on preset information or based on preset information and a preset parameter, a target SL resource for a target SL service from candidate SL resources comprises:

determining, as the target SL resource based on the preset information, an SL resource in the candidate SL resources that is used by the Uu interface.

3. The method according to claim 1, wherein the determining, as the target SL resource based on the preset information, an SL resource in the candidate SL resources that is used by the Uu interface and is in an active state comprises:

determining, as the target SL resource, an SL resource corresponding to a secondary cell (Scell) or a bandwidth part (BWP) in the candidate SL resources that is used by the Uu interface and is in an active state.

4. The method according to claim 1, wherein the preset information comprises the related information of the resource used by the Uu interface, and the related information comprises information about interference caused by the resource used by the Uu interface to the candidate SL resources; and the determining, based on preset information or based on preset information and a preset parameter, a target SL resource for a target SL service from candidate SL resources comprises:

determining, as the target SL resource based on the preset information, an SL resource with a degree of interference that is caused by the resource used by the Uu interface and is less than a first threshold, in the candidate SL resources.

5. The method according to claim 1, wherein the candidate SL resources comprise resources in the SL resource pool corresponding to different radio access technologies (RAT) supported by the terminal device, the preset information comprises the related information of the resource used by the Uu interface.

6. The method according to claim 1, further comprising:

determining, based on at least one of characteristic information of the terminal device and characteristic information of the target SL service, the attribute of the carrier carrying the target SL resource; wherein the determining, based on preset information or based on preset information and a preset parameter, a target SL resource for a target SL service from candidate SL resources comprises:

determining, as the target SL resource based on the preset information, an SL resource in the candidate SL resources that has the attribute.

7. The method according to claim 6, wherein the characteristic information of the terminal device comprises a movement speed of the terminal device;

the characteristic information of the target SL service comprises either of information about a priority of the target SL service and information about a logical channel carrying the target SL service; and the attribute is represented by a subcarrier spacing (SCS) or a BWP.

8. The method according to claim 1, wherein the determining, based on preset information, a target SL resource for a target SL service from candidate SL resources comprises:

determining, based on the preset information, a first SL resource for the target SL service from the candidate SL resources; or wherein the determining, based on preset information and a preset parameter, a target SL resource for a target SL service from candidate SL resources comprises:

determining, based on the preset information, a first SL resource for the target SL service from the candidate SL resources, and determining, when a preset parameter of the first SL resource and a preset parameter of a second SL resource satisfy a first preset condition, the second SL resource as the target SL resource, wherein the second SL resource is an SL resource in the candidate SL resources.

9. The method according to claim 8, wherein the preset parameter comprises the utilization rate of the candidate SL resources; and the determining, when a preset parameter of the first SL resource and a preset parameter of a second SL resource satisfy a first preset condition, the second SL resource as the target SL resource comprises:

when a utilization rate of the first SL resource is higher than a utilization rate of the second SL resource by a second threshold, determining the second SL resource as the target SL resource.

10. The method according to claim 8, wherein the preset parameter comprises the communication quality parameter of the candidate SL resources; and the determining, when a preset parameter of the first SL resource and a preset parameter of a second SL resource satisfy a first preset condition, the second SL resource as the target SL resource comprises:

when a communication quality parameter of the first SL resource is lower than a communication quality parameter of the second SL resource by a third threshold, determining the second SL resource as the target SL resource.

11. The method according to claim 1, wherein the determining, based on preset information and a preset parameter, a target SL resource for a target SL service from candidate SL resources comprises:

determining, as the target SL resource, an SL resource in the candidate SL resources for which the preset parameter satisfies a second preset condition.

12. A terminal device, comprising a memory, a processor, and a wireless communication program stored on the memory and running on the processor, wherein when the wireless communication program is executed by the processor, the processor is configured to implement:

determining, based on preset information or based on preset information and a preset parameter, a target sidelink (SL) resource for a target SL service from candidate SL resources; wherein wherein the preset information comprises a related information of the resource used by a Uu interface of the terminal device, and the related information comprises information indicating activation or deactivation of an SL resource used by the Uu interface and information about a RAT selected by the Uu interface; and wherein the preset parameter comprises at least one of a utilization rate of the candidate SL resources and a communication quality parameter of the candidate SL resources;

determining, as the target SL resource based on the preset information, an SL resource in the candidate SL resources that is used by the Uu interface and is in an active state;

determining, based on the preset information, a target RAT selected by the Uu interface; and determining the SL resource as the target SL resource from an SL resource pool that corresponds to the target RAT, in the candidate SL resources.

13. The terminal device according to claim 12, wherein the candidate SL resources comprise SL resources that are located on a supplementary uplink (SUL) carrier and a non-SUL carrier respectively and have same quality of service (QoS) parameters, the preset information comprises the related information of the resource used by the Uu interface, and the related information comprises information about an SL resource used by the Uu interface; and the determining, based on preset information or based on preset information and a preset parameter, a target SL resource for a target SL service from candidate SL resources comprises:

determining, as the target SL resource based on the preset information, an SL resource in the candidate SL resources that is used by the Uu interface.

14. The terminal device according to claim 12, wherein the preset information comprises the related information of the resource used by the Uu interface, and the related information comprises information about interference caused by the resource used by the Uu interface to the candidate SL resources; and the determining, based on preset information or based on preset information and a preset parameter, a target SL resource for a target SL service from candidate SL resources comprises:

determining, as the target SL resource based on the preset information, an SL resource with a degree of interference that is caused by the resource used by the Uu interface and is less than a first threshold, in the candidate SL resources.

15. The terminal device according to claim 12, wherein the candidate SL resources comprise resources in the SL resource pool corresponding to different radio access technologies (RAT) supported by the terminal device, the preset information comprises the related information of the resource used by the Uu interface.

16. The terminal device according to claim 12, wherein when the wireless communication program is executed by the processor, the processor is further configured to implement:

determining, based on at least one of characteristic information of the terminal device and characteristic information of the target SL service, the attribute of the carrier carrying the target SL resource; wherein the determining, based on preset information or based on preset information and a preset parameter, a target SL resource for a target SL service from candidate SL resources comprises:

determining, as the target SL resource based on the preset information, an SL resource in the candidate SL resources that has the attribute.

17. The terminal device according to claim 12, wherein the determining, based on preset information or based on preset information and a preset parameter, a target SL resource for a target SL service from candidate SL resources comprises:

determining, based on the preset information, a first SL resource for the target SL service from the candidate SL resources; or wherein the determining, based on preset information and a preset parameter, a target SL resource for a target SL service from candidate SL resources comprises:

determining, based on the preset information, a first SL resource for the target SL service from the candidate SL resources, and determining, when a preset parameter of the first SL resource and a preset parameter of a second SL resource satisfy a first preset condition, the second SL resource as the target SL resource, wherein the second SL resource is an SL resource in the candidate SL resources.

18. A non-transitory computer-readable medium, wherein the non-transitory computer-readable medium stores a wireless communication program, and when the wireless communication program is executed by a processor, the processor is configured to implement:

determining, based on preset information or based on preset information and a preset parameter, a target sidelink (SL) resource for a target SL service from candidate SL resources; wherein wherein the preset information comprises a related information of the resource used by a Uu interface of the terminal device, and the related information comprises information indicating activation or deactivation of an SL resource used by the Uu interface and information about a RAT selected by the Uu interface; and wherein the preset parameter comprises at least one of a utilization rate of the candidate SL resources and a communication quality parameter of the candidate SL resources;

determining, as the target SL resource based on the preset information, an SL resource in the candidate SL resources that is used by the Uu interface and is in an active state;

determining, based on the preset information, a target RAT selected by the Uu interface; and determining the SL resource as the target SL resource from an SL resource pool that corresponds to the target RAT, in the candidate SL resources.

* * * * *